(12) United States Patent
Carlsson (10) Patent No.: US 6,987,979 B2
(45) Date of Patent: Jan. 17, 2006

(54) LOCATING PACKET-SWITCHED MOBILE TERMINALS USING NETWORK INITIATED ARTIFICIAL CELL HOPS

(75) Inventor: Hans Carlsson, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 704 days.

(21) Appl. No.: 10/028,434

(22) Filed: Dec. 22, 2001

(65) Prior Publication Data

US 2003/0119524 A1 Jun. 26, 2003

(51) Int. Cl.
*H04Q 7/20* (2006.01)
(52) U.S. Cl. .............................. 455/456.6; 455/456.1; 455/502
(58) Field of Classification Search ............. 455/456.1, 455/456.3, 456.5, 456.6, 502, 503, 457, 67.11, 455/436, 404.2, 422.1, 446, 449, 524, 525; 342/450, 458, 463, 126, 118
See application file for complete search history.

(56) References Cited

U.S. PATENT DOCUMENTS

| | | | | |
|---|---|---|---|---|
| 5,423,067 | A * | 6/1995 | Manabe ...................... | 455/524 |
| 5,828,659 | A * | 10/1998 | Teder et al. ............. | 455/67.16 |
| 6,052,597 | A | 4/2000 | Ekstrom | |
| 6,097,959 | A * | 8/2000 | Yost et al. ............... | 455/456.2 |
| 6,219,557 | B1 | 4/2001 | Havinis | |
| 6,252,543 | B1 * | 6/2001 | Camp ...................... | 455/456.1 |
| 6,321,083 | B1 * | 11/2001 | Vaara et al. ............. | 455/456.1 |
| 2003/0139188 | A1 * | 7/2003 | Chen et al. .................. | 455/456 |
| 2003/0203738 | A1 * | 10/2003 | Brown et al. ............ | 455/456.1 |
| 2004/0203921 | A1 * | 10/2004 | Bromhead et al. ....... | 455/456.1 |

FOREIGN PATENT DOCUMENTS

| | | |
|---|---|---|
| WO | WO98/15150 | 3/1998 |
| WO | WO99/39539 | 7/1999 |
| WO | WO99/56493 | 9/1999 |
| WO | WO00/30393 | 5/2000 |

OTHER PUBLICATIONS

3rd Generation Partnership Project; Technical Specification Group GSM/EDGE 3GPP TS 43.059 V5.0.0 (Aug. 2001).
3rd Generation Partnership Project; Technical Specification Group Services and System Aspects; 3GPP TS 23.271 V5.0.0 (Oct. 2001).
3rd Generation Partnership Project; Technical Specification Group GSM/EDGE 3GPP TS 05.10 V8.0.0 (Apr. 2001).
3rd Generation Partnership Project; Technical Specification Group GSM EDGE Radio Access Network; 3GPP TS 04.18 V8.11.0 (Sep. 2001).

* cited by examiner

*Primary Examiner*—Eliseo Ramos-Feliciano (57) ABSTRACT

Determining the position of a mobile terminal operating in a packet-switched communications system based on timing advance values obtained through network initiated artificial cell hops. The mobile terminal may be instructed to perform a series of artificial cell changes so that timing advance values may be obtained for the mobile terminal with respect to a plurality of base stations. The position of the mobile terminal is then determined based on the timing advance values, optionally supplemented by signal strength measurements. The mobile terminal may contact a network entity via the base station in each cell before being instructed to change to the next base station. Or, the mobile terminal may be supplied with a list of base stations to contact, with the mobile terminal transmitting short access bursts to the base station in a given cell before automatically tuning to the next cell, without waiting for an acknowledgement.

12 Claims, 7 Drawing Sheets

LOCATING PACKET-SWITCHED MOBILE TERMINALS USING NETWORK INITIATED ARTIFICIAL CELL HOPS

BACKGROUND OF THE INVENTION

The present invention relates to wireless communications, and more particularly to a method of determining the position of a wireless communications mobile terminal operating in a packet-switched communications system.

A number of methods have been proposed for determining the position of a wireless communications mobile terminal (e.g., cell phone). One common method is to rely on a separate satellite-based system, such as GPS, typically by incorporating a GPS positioning receiver into the mobile terminal. However, the GPS receiver consumes power, adds complexity, and adds cost to the mobile terminal. Other methods, such as that described in WO-9956493 and WO-9815150, may function for circuit switched communications systems, but do not work well for packet-switched communications systems. Still other methods, such as that described in WO-0030393, rely on a time of arrival approach, which requires that additional location measurement units (LMUs) be deployed in the communications system, with attendant costs. As such, there remains a need for new methods of determining the position of a wireless communications mobile terminal operating in a packet-switched communications system.

BRIEF SUMMARY OF THE INVENTION

The present invention provides an approach to determining the position of a wireless communications mobile terminal operating in a packet-switched communications system that is based on timing advance values obtained through network initiated artificial cell hops. In a first aspect of the invention, a mobile terminal is instructed to perform a series of artificial cell changes (cell changes not otherwise needed) so that timing advance values may be obtained for the mobile terminal with respect to a plurality of base stations. The position of the mobile terminal is then determined based on the timing advance values, optionally supplemented by signal strength measurements. In some embodiments, the mobile terminal contacts a network entity via the base station in each cell before being instructed by the communications system to retune to the next base station. In other embodiments, the mobile terminal is supplied with a list of base stations to contact, with the mobile terminal transmitting short access bursts to the base station in a given cell before automatically proceeding to the next cell on the list, without waiting for an acknowledgement to the access requests. In some embodiments, the process may take advantage of a priori knowledge of the sector configuration in sectorized cells to help determine the location of the mobile terminal.

DETAILED DESCRIPTION OF THE INVENTION

As the present invention relates to determining the location of a wireless communications mobile terminal 80 operating in a packet-switched communications system 30, a brief overview of a packet-switched communications system 30 may help in placing the present invention in context.

Figure 1:
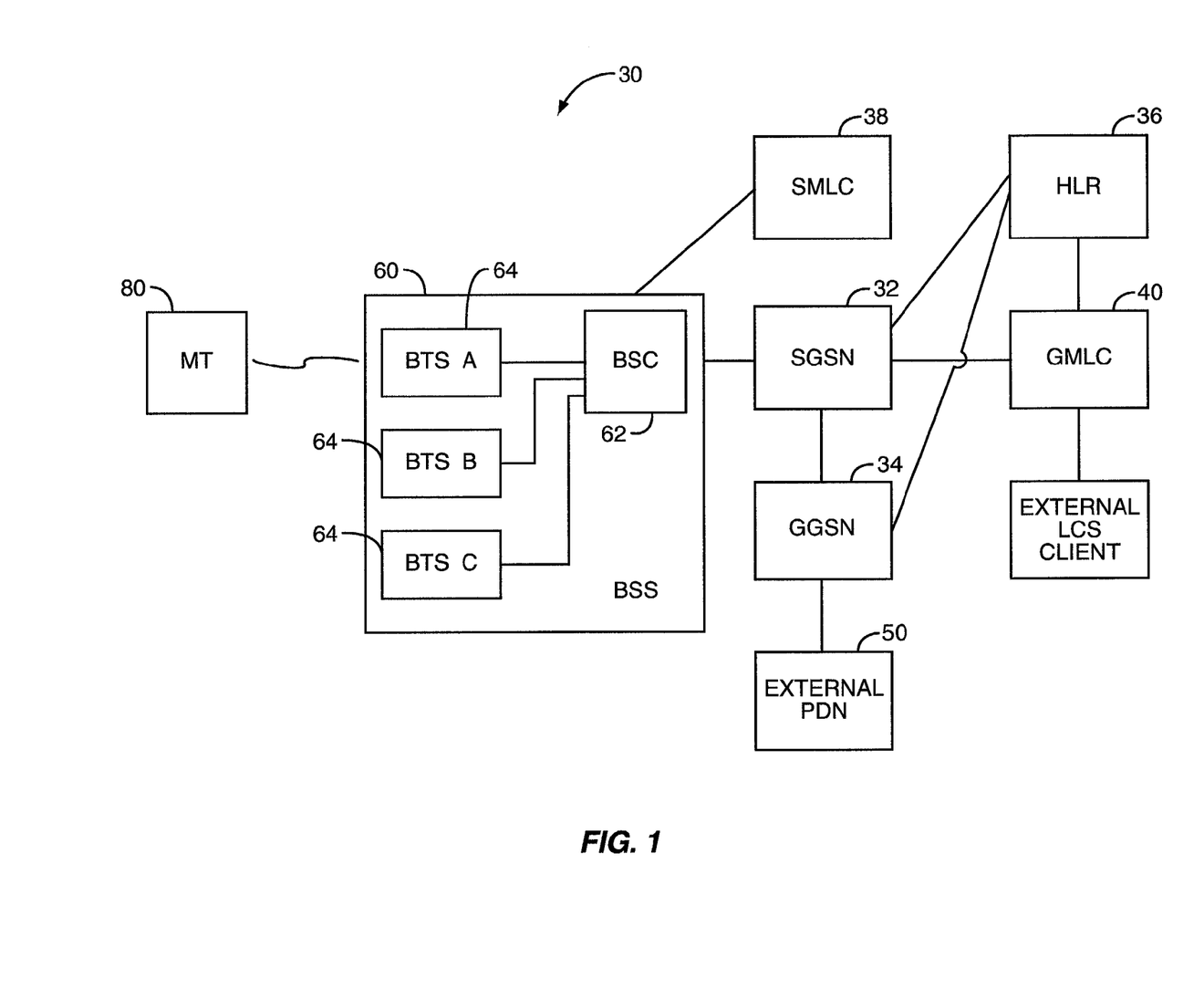
FIG. 1 is a functional block diagram of a GPRS packet data network.

FIG. 1 shows the logical architecture of a packet-switched system 30 (or "packet-switched network") implementing General Packet Radio Service (GPRS) developed for Global System for Mobile Communications (GSM). The packet-switched system 30 of FIG. 1 comprises at least one Serving GPRS Support Node (SGSN) 32, a Gateway GPRS Support Node (GGSN) 34, a Home Location Register (HLR) 36, a Serving Mobile Location Center (SMLC) 38, a Gateway Mobile Location Center (GMLC) 40, a Base Station Subsystem (BSS) 60, and one or more mobile terminals (MT) 80 (only one shown).

The SGSN 32 contains the functionality required to support GPRS. SGSN 32 provides network access control for packet-switched network 30. Network access is the means by which a user is connected to a telecommunications network in order to use the services of the network. The SGSN 32 connects to the BSS 60, typically by a Frame Relay Connection. In the packet-switched network 30, there may be more than one SGSN 32, and each SGSN may connect to more than one BSS 60.

The GGSN 34 provides interworking with external packet-switched networks, referred to as packet data networks (PDN) 50, and is typically connected to the SGSN 32 via a backbone network using the X.25 or TCP/IP protocol. The GGSN 34 may also connect the packet-switched network 30 to other public land mobile networks (PLMN). The GGSN 34 is the node that is accessed by the external packet data network 50 to deliver packets to a mobile terminal 80 addressed by a data packet. Data packets originating at the mobile terminal 80 addressing nodes in the external PDN 50 also pass through the GGSN 34. Thus, the GGSN 34 serves as the gateway between users of the packet-switched network 30 and the external PDN 50, which may, for example, be the Internet or other global network. The SGSN 32 and GGSN 34 functions can reside in separate physical nodes of the packet-switched network 30 or may be in the same node.

The HLR 36 stores subscriber information and which SGSN the subscriber is currently registered in. As the mobile terminal 80 moves about within the network, it periodically registers with the network so that the network can track the whereabouts of the mobile terminal 80. The network updates the location information in the HLR 36 when needed.

The SMLC 38 contains functionality required to support location services (LCS). The SMLC 38 manages the overall coordination and scheduling of resources required to perform positioning of a mobile terminal 80 and is therefore sometimes referred to as the location server. The SMLC 38 may calculate the final location estimate of the mobile terminal 80 and the accuracy thereof. The overall functionality of the SMLC 38 may be that set forth in 3GPP TS 23.271, "Technical Specification Group Services and System Aspects; Functional Stage 2 Description of LCS (Release 4) version 5.0.0," and/or 3GPP TS 43.059 "Technical Specification Group GSM/EDGE Radio Access Network; Functional Stage 2 Description of Location Services (LCS) in GERAN (Release 5) version 5.0.0," the disclosures of which are incorporated herein by reference. In the packet-switched network 30, there may be more than one SMLC 38.

The GMLC 40 also contains functionality required to support location services. The GMLC 40 is the first node an external LCS client accesses in a GSM network 30. The GMLC 40 may request routing information from the HLR 36 via an appropriate interface. The overall functionality of the GMLC 40 may be that set forth in 3GPP TS 43.059 and/or 3GPP TS 23.271, referenced above. In the packet-switched network 30, there may be more than one GMLC 40.

The BSS 60, sometimes referred to herein simply as the "base station," provides an interface between mobile terminals 80 and the network 30. The base station 60 typically includes a Base Station Controller (BSC) 62 and a Base Transceiver Station (BTS) 64. The BTS 64 contains radio transmission and reception equipment, up to and including the antennas, and also contains the signal processing specific to the radio interface. The BSC 62 typically connects the BTS 64 with the SGSN 32 and performs most management and control functions of the BSS 60. The main functions of the BSC 62 include allocation and release of radio channels, and handover management. As is known in the art, a given BSC 62 may oversee a plurality of BTS 64, as shown in FIG. 1. As used herein, the term "base station" is intended to refer to a given pairing of BSC 62 and BTS 64, or their functional equivalents. Thus, while FIG. 1 shows a single box for BSS 60, there are actually three conceptual base stations 60 depicted therein.

The mobile terminal 80 may take any form known in the art. For purposes of discussion herein, the mobile terminal 80 is assumed to be a GSM adapted mobile terminal with GPRS capability. The mobile terminal 80 registers with the SGSN 32 to receive packet data services in a conventional fashion. After registration, the mobile terminal 80 typically camps on an appropriate control channel, such as a Packet Common Control Channel (PCCCH), a Packet Broadcast Control Channel (PBCCH), a Common Control Channel (CCCH), a Broadcast Control Channel (BCCH), or the like.

Figure 2:
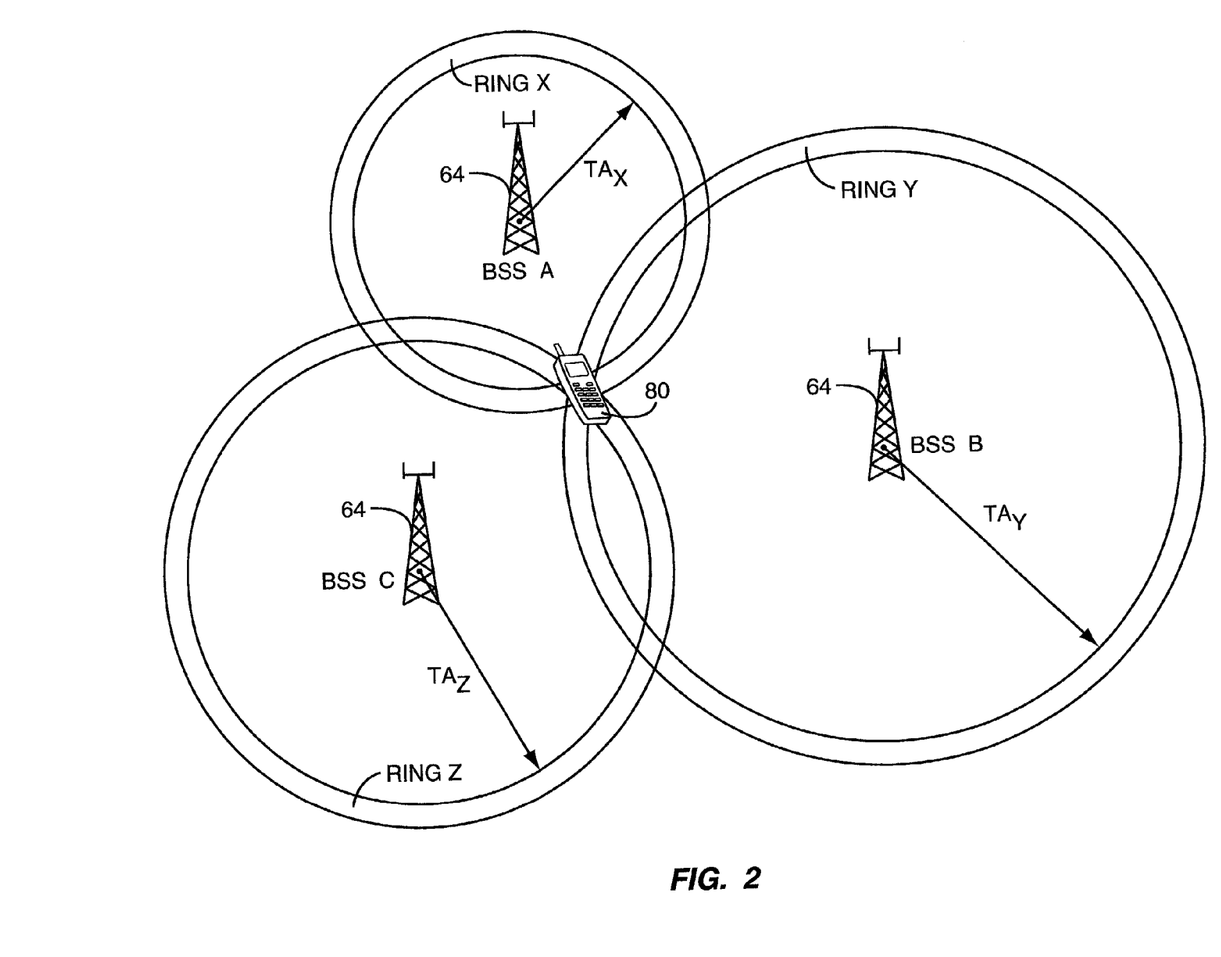
FIG. 2 illustrates the principle behind using three or more base stations to locate a mobile terminal based on the respective timing advance values.

The theoretical basis underlying one aspect of the present invention may be seen in FIG. 2. When the mobile terminal 80 synchronizes and transmits to BSS A 60 (hypothetically, the combination of BSC ".alpha." 62 and BTS A 64), BSS A is able to determine a "timing advance" (TA) value associated with that mobile terminal. Timing advance is a signal sent by BTS 64 (not shown) to mobile terminal 80 which mobile terminal 80 uses to advance its timings of transmissions to BTS 64 (not shown) so as to compensate for propagation delay. The BTS measures the delay of an access burst transmission relative to the expected signal from the mobile terminal 80 at zero distance under static conditions to determine the timing advance value for mobile terminal 80 (see section 5.4 of GSM specification (e.g., 3GPP TS 05.10 "Technical Specification Group GSM/EDGE Radio Access Network; Digital Cellular Telecommunications System (Phase 2+); Radio Subsystem Synchronization (Release 1999), and PCT Application publication WO 98/15150, which are incorporated herein by reference). Based on this timing advance, the general position of the mobile terminal 80 may be determined as being somewhere within ring X, generally centered about the receiving antenna(s) of BSS A. Due to the relative resolution of the timing advance and the propagation velocity of radio waves, ring X typically has a width of approximately 500 meters (based on typical GSM and GPRS systems). Based on the timing advance for BSS A, the location of the mobile terminal 80 may be anywhere within ring X. However, if a timing advance from the same mobile terminal 80 to BSS B (e.g., BSC ".alpha." and BTS B) is available, indicating that the mobile terminal 80 is also within ring Y, then the mobile terminal 80 should be located where ring X and ring Y intersect. However, ring X and ring Y intersect at two areas In order to determine which of these two intersecting area is correct, reference is made to the timing advance from the same mobile terminal 80 to BTS C (e.g., BSC ".alpha." and BTS C, or BSC ".beta." and BTS C), indicating that the mobile terminal 80 Is also located within ring Z. As rings X,Y,Z should only intersect in one area, the mobile terminal 80 should be located where the area where rings X,Y,Z intersect. Thus, if the appropriate timing advance values for BSS A–C are available, the location of the mobile terminal 80 may be determined without resort to GPS or the like. For the best resolution, the various timing advance values should be gathered over a short period of time, so as to minimize the effects of intervening movement by the mobile terminal 80.

The process flow for one aspect of the present invention may be described with reference to FIG. 3. The position determination process may be triggered by a position request from the external PDN 50, an external LCS client, or from some other source. A position request is sent by the SMLC 38 to BSS 60 (box 210). This request may take the form of a BSSLAP-LE message indicating that SMLC 38 needs the relevant timing advance (TA) information and that the approach of the present invention should be employed. If the timing advance value for the mobile terminal 80 is available (box 220), BSS 60 then skips to step 240. If the timing advance value for the mobile terminal 80 is not available at BSS A, then BSS A may acquire the timing advance value via steps 230–234. If there is no PBCCH allocated in the current cell and the mobile terminal 80 is in packet idle mode (box 230), BSS A performs a packet paging (box 232), e.g., sends a paging request type 1, 2, or 3, to the mobile terminal 80. If there is a PBCCH allocated in the current cell, or the mobile terminal 80 is in packet transfer mode (box 230), BSS A sends a packet polling request to the mobile terminal 80 (box 234). In either event, the mobile terminal 80 responds to BSS A, e.g., sends a page response or a packet control acknowledgement (boxes 232–234). Based on this response, BSS A is able to determine the timing advance value for the mobile terminal 80 associated with that cell via known methods. At this point, the timing advance value for the mobile terminal 80 is known with respect to one cell.

In order to obtain the timing advance value for mobile terminal 80 with respect to two other cells, BSS 60 causes the mobile terminal 80 to artificially change cells (boxes 240–260). That is, BSS 60 causes the mobile terminal 80 to change cells for the purpose of obtaining a timing advance value, when the mobile terminal 80 would not otherwise do so. BSS 60, and typically the BSC 62 of BSS A 60, determines which cell, other than the current cell, that the mobile terminal can best be sent to (box 240). If no suitable cell can be found by the BSS 60, an appropriate error message may be sent to the SMLC 38. The BSS 60 sends a packet cell change order message the mobile terminal 80, via the BTS 64 associated with the current cell, to order the mobile terminal 80 to change to the cell the BSS 60 determined was best (box 240). This packet cell change order message should inform the mobile terminal 80 about which frequency to tune to and what base station identity code (BSIC) should be found on that frequency. The details of the packet cell change order are known to those of skill in the art.

The mobile terminal 80 synchronizes to the cell it was ordered to go to (BSS B), makes an access request and requests an uplink channel (e.g., a packet channel request or a channel request). When the mobile terminal 80 is assigned an uplink channel, it sends an LLC frame to the SGSN 32, such by performing a cell update procedure. Performing this procedure allows the BSS B (typically the BTS 64 thereof) to determine the timing advance value for mobile terminal 80 with respect to the new cell (box 250). If for some reason the mobile terminal 80 fails to synchronize to the new cell, the mobile terminal 80 may return to the first cell and send a failure message to the BSS 60, as is known in the art for handling packet cell change failure.

Steps 240–260 may then be repeated to cause the mobile terminal 80 to artificially hop from the second cell (BSS B) to the third cell (BSS C), thereby obtaining the timing advance value for the mobile terminal 80 with respect to the third cell. Afterwards, the mobile terminal 80 may remain with the third cell, or may be ordered to hop back to the first cell by the BSS 60, depending on communications conditions, such as signal strength, loading, etc.

At this point, the timing advance values for the mobile terminal 80 with respect to three different cells are known to the BSS 60. The BSS 60 sends these three liming advance values, with their corresponding cell (or base station) identifications, to the SMLC 38 (box 270), such as via a BSSLAP Enhanced TA response message contained in a BSSAP-LE connection oriented information message. The SMLC 38 then determines the position of the mobile terminal 80 based on the supplied timing advance values and the cell identifications (box 280). Note that it is assumed that the SMLC 380 is aware of the locations of the relevant BSS 60 (or at least the respective BTS 64 thereof), via earlier manual entry, co-located GPS receivers at the BSS 60, or any other method known in the art. The position of the mobile terminal 80 may then be forwarded to the requesting network entity in any manner known in the art.

As a variant to the above, the SMLC 38 may inform the BSS 60 which cells to send the mobile terminal 80 to, instead of the BSS 60 determining this itself (box 240). In addition, suitable safeguards for screening and/or authorizing of position requests/reports may be added to process.

The process(es) described above require the mobile terminal 80 to send information to the SGSN 32, or other upstream network element, via the "new" BSS 60 when changing cells. Because the induced cell change is artificial and not otherwise needed, this signaling may add to system interference and/or reduce capacity. As such, it may be desirable to lessen the amount of over-the-air signaling required to obtain the timing advance values. One approach for this is to allow the mobile terminal 80, when contacting the "new" cells, to send an appropriate number of access bursts to the relevant BSS 60, and then move on to the next cell without waiting for an acknowledgment from the BSS 60. Therefore, the consumption of bandwidth and system capacity by additional messages from the mobile terminal to the SGSN 32 via each BSS 60 is avoided. A process along these lines is shown in FIG. 4. In this process, the first several steps are similar to those shown in FIG. 3. However, rather than the BSS 60 directly triggering the mobile terminal 80 to perform an actual cell change for each "hop," (boxes 240–260 of FIG. 3) the BSS 60 tells the mobile terminal 80 about all the hops (box 310) and then allows the mobile terminal 80 to execute the hops (boxes 320–330). For instance, after securing the timing advance value for the first cell, the BSS 60 sends the mobile terminal 80 a PACKET POSITIONING ORDER message (box 310). The basic idea is to supply the mobile terminal 80 with the information it needs to make an access burst to each of the cells that it is being directed towards by the BSS 60, preferably in the PACKET POSITIONING ORDER. As such, the PACKET POSITIONING ORDER should that contain the temporary logical link identity (TLLI), one or more frequencies to which the mobile terminal 80 should tune, and the BSIC it should expect to find there. If there is a PBCCH present in the relevant target cell, the PACKET POSITIONING ORDER may inform the mobile terminal 80 of which Uplink State Flag (USF) it should utilize in that cell. If there is not a PBCCH present in the relevant target cell, the PACKET POSITIONING ORDER may inform the mobile terminal 80 of which random number, and optionally what establishment cause, to use in its access. In addition, the PACKET POSITIONING ORDER message may optionally include an indication of the number of access bursts the mobile terminal 80 should send to each BTS 64, as well as power control parameters, whether there is a PBCCH or not on the indicated frequency, and the like.

As is known in the art, the random number discussed in the immediately preceding paragraph is conceptually a temporary identifier used by the mobile terminal 80 when sending access bursts. Due to the limited amount of bits allowed in an access burst, a shorter temporary identity is typically needed for access bursts rather than the full "normal" identity of the mobile terminal 80. For further reference on the random number, see 3GPP TS 04.18, "Technical Specification Group GSM/EDGE Radio Access Network; Mobile Radio Interface Layer 3 Specification, Radio Resource Control Protocol (Release 1999)" (incorporated herein by reference), particularly section 9.1.8. This 3GPP TS 04.18 specification further contains information on the establishment cause discussed above. It may be advantageous for the establishment cause code within the access burst to correspond either to an otherwise unused establishment cause code or one specifically reserved for location determination usage.

Armed with the information from the BSS 60, the mobile terminal 80 synchronizes to the first cell on the list and sends the appropriate number of access bursts (box 320), moves onto the next cell in the list (box 330), synchronizes and sends the access bursts (box 320), etc. without waiting for an acknowledgment from the BSS 60 for each hop. The access bursts allow the BSS 60 to determine the timing advance value for the mobile terminal 80 with respect to each cell, in turn. After access bursts have been sent to each cell on the list from the PACKET POSITIONING ORDER, the mobile terminal 80 preferably returns to the original cell. Of course, if the mobile terminal 80 cannot synchronize to one or more of the cells on the list, the mobile terminal 80 should inform the BSS 60 of this error.

Figure 3:
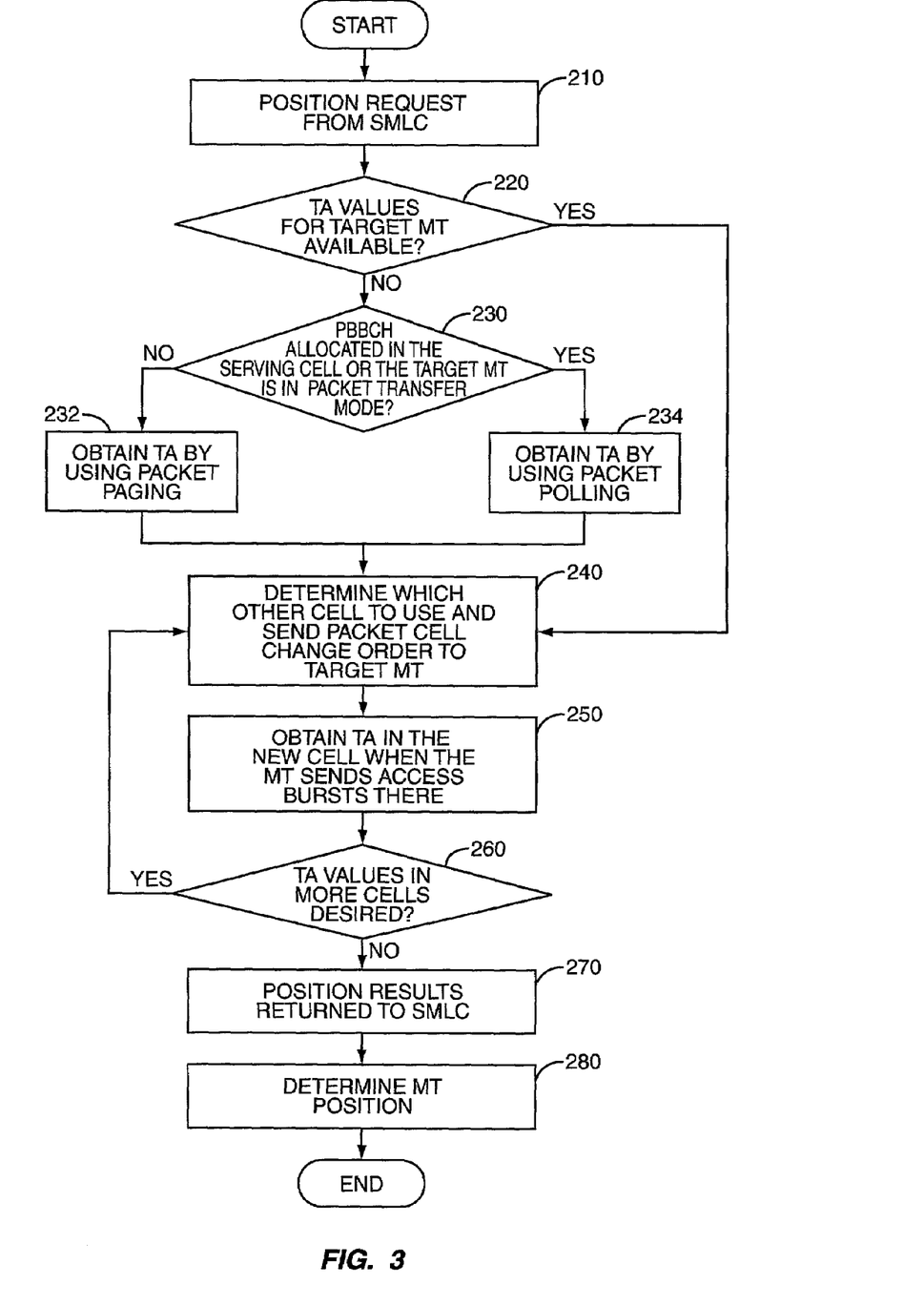
FIG. 3 shows a process flowchart of one location determining process according to the present invention.
Figure 4:
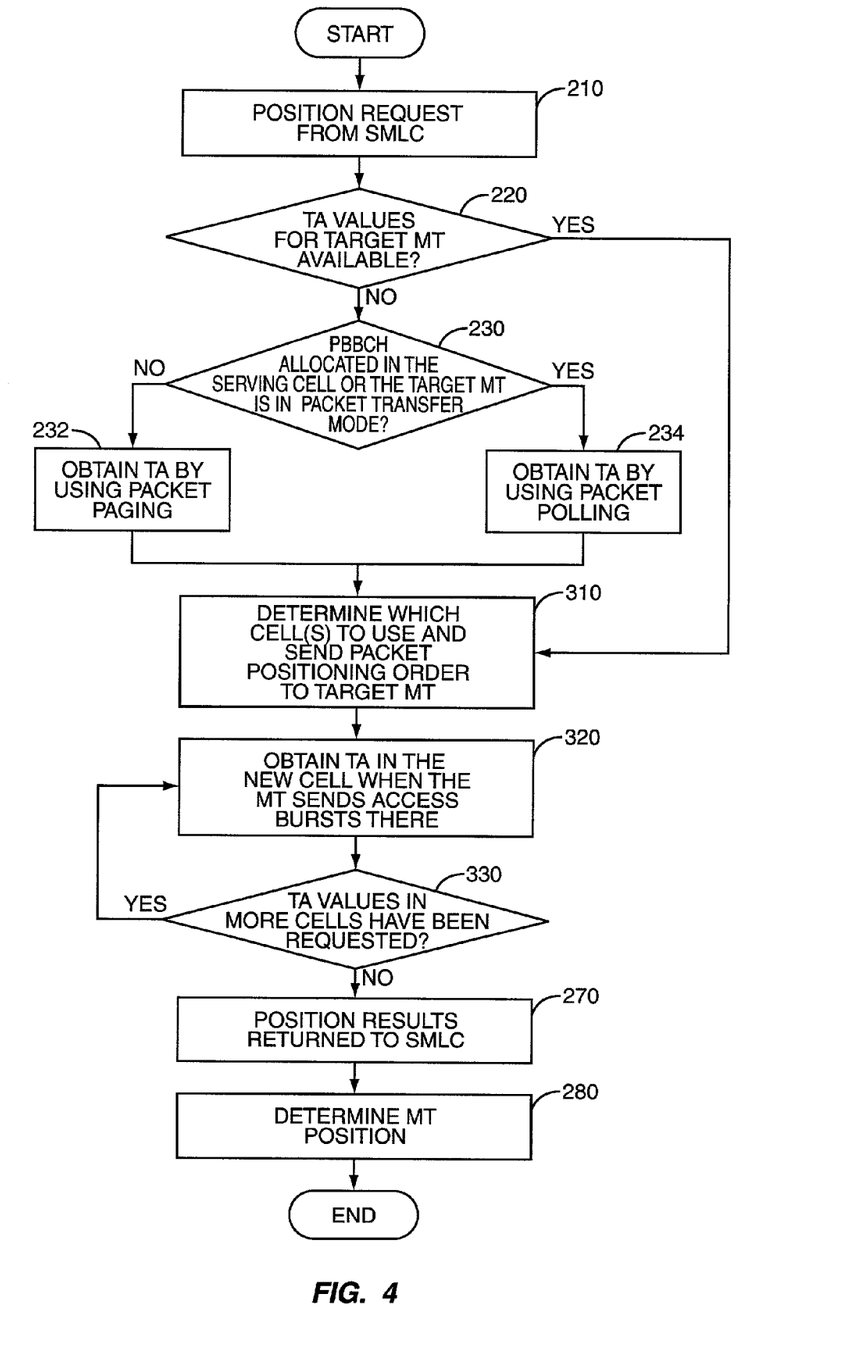
FIG. 4 shows a process flowchart of another location determining process according to the present invention.

If this multihop procedure was successful, the BSS 60 sends the cell identifications and corresponding timing advance values to the SMLC 38, as in FIG. 3 and the process then continues as described above. Also, as with the process of FIG. 3, the SMLC 38 may inform the BSS 60 which cells to target the mobile terminal 80 at, instead of the BSS 60 determining this itself. Also, the mobile terminal 80 may, at reception of the PACKET POSITIONING ORDER, optionally suspend packet data operation to ensure that no downlink data is lost while the positioning procedure is going on.

The process of FIG. 4 is believed to be more resource efficient than that of FIG. 3. However, the process of FIG. 4 requires that additional functionality be added to the mobile terminal 80 and the system components, which, while rather straightforward, may not be possible with older equipment. In contrast, the process of FIG. 3 should function with existing mobile terminals 80 that are compliant with existing R97 or later versions of the GPRS standard.

Figure 5:
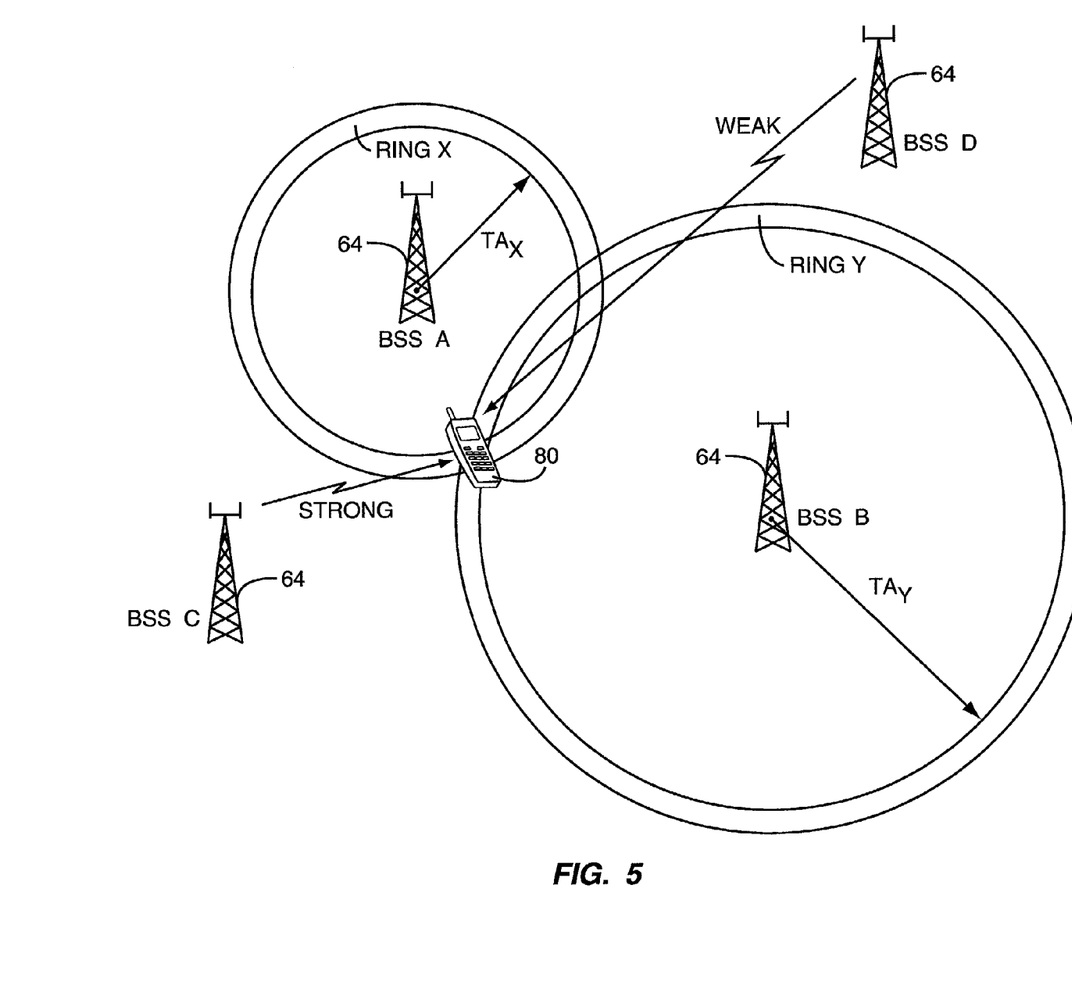
FIG. 5 illustrates the principle behind using four more base stations to locate a mobile terminal based on the respective timing advance values for two base stations and the signal strengths, received at the mobile terminal, from another two base stations.

The locating processes above may be altered when three suitable base stations 64 are not available, or when it is desired to reduce signaling traffic. With reference to FIG. 5, if the timing advance values for two cells are known, then the mobile terminal 80 should be in one of two areas where the relevant rings intersect. If the signal strengths for two other bases stations, BSS C and BSS D, are also known, then the correct intersecting area can be determined. If the mobile terminal 80 is in the lower intersecting area, as shown, then the signal strength from BSS C should be stronger than from BSS D. One the other hand, if the mobile terminal 80 is in the upper intersecting area, the signal strength from BSS D should be stronger than from BSS C. The process of FIG. 6 utilizes this principle. In this vein, it is known for the mobile terminal 80 to take signal strength measurements for selected cells, typically those on what is known as a neighbor list. These signal strengths are typically in the form of RSSI measurements. These RSSI measurements are known to the mobile terminal, and may be supplied to the BSS 60 in any fashion known in the art. The use of neighbor lists and the taking/reporting of RSSI measurements are both generally known in the art, so details thereof are omitted for brevity.

Figure 6:
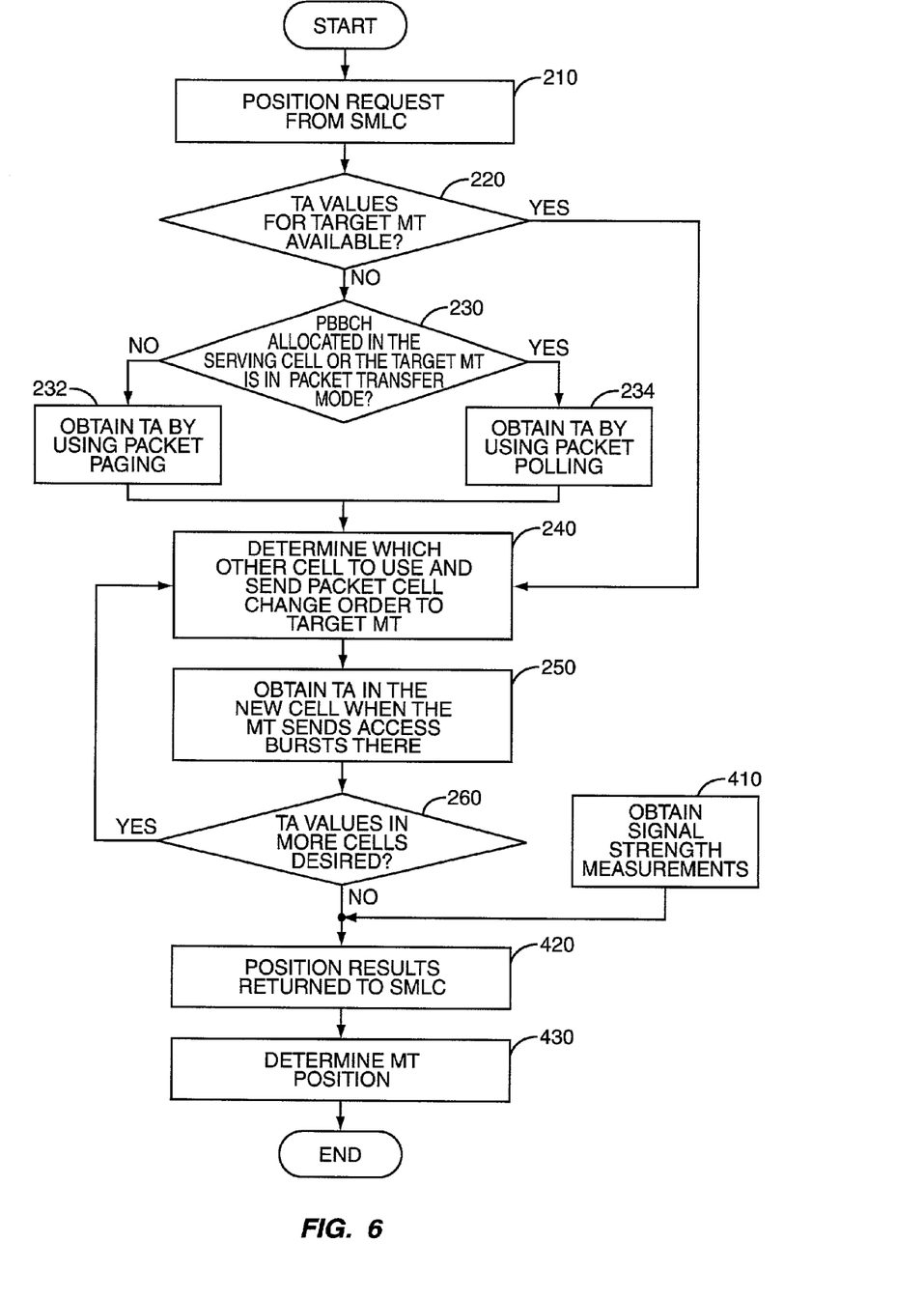
FIG. 6 shows a process flowchart of still another location determining process to according to the present invention.

The overall process using the signal strength measurements is shown in FIG. 6. As can be seen, the first several steps are the same as in FIG. 3, and the same reference numbers are used. However, rather than securing three or more timing advance values, the BSC 62 need only secure two timing advance values. Once the BSS 60 secures the timing advance values for at least two cells (boxes 240-260), the BSS 60 combines the timing advance values, the supplied signal strength measurements (box 410), the relevant cell ids, and sends the same to the SMLC 38 (box 420). The SMLC 38 then determines, or estimates, the location of the mobile terminal 80 based on the supplied timing advance values, the supplied signal strength measurements, and the cell identifications (box 430).

This same modification—using comparative signal strengths of two additional base stations 64 instead of one cell's timing advance value—may also be made to the process of FIG. 4.

Figure 7:
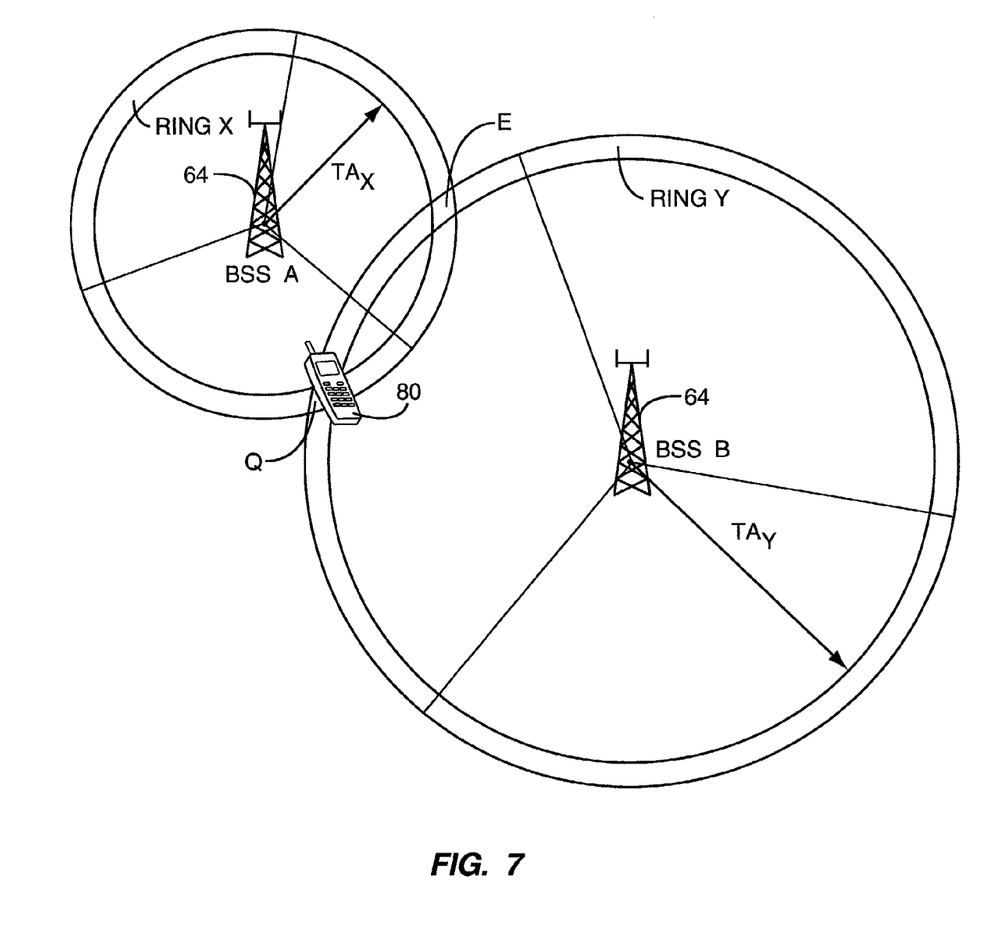
FIG. 7 illustrates the principle behind using two or more base stations to locate a mobile terminal based on the respective timing advance values in a sectorized cell environment.

In the discussion above, it has been assumed that the cells are non-sectorized for simplicity. However, the same general principles may be applied in sectorized cells as well. For instance, as shown in FIG. 7, the location of the mobile terminal 80 may be determined, in favorable circumstances, based on two or more timing advance values, as the boundaries of the relevant sector itself may help eliminate other possible locations. As shown in FIG. 7, the mobile terminal may be in location Q or E based on the two respective timing advances of cells A and B, but location E may be eliminated as a possibility because it falls outside the relevant sector of cell A. Thus, the basic process flow of FIG. 3 or FIG. 4 may be used with sectorized cells, but with only one "hop" to a different cell being required. Of course, under such a scenario, suitable logic should be implemented in the SMLC 38 to determine if the cells are sectorized and to determine the location of the mobile terminal 80 based on the timing advances from two or more cells and the sector configuration of the respective cells. Thus, when the cells are sectorized, the general location determination processes outlined above may be applied with fewer artificial cell hops than previously described, without departing from the present invention.

As is evident from the discussion above, the terms "hop" or "cell hop" are intended to encompass both a situation where the mobile terminal 80 registers with the new cell in a cell change (e.g., FIG. 3), and where the mobile terminal 80 simply sends access burst(s) or the like to the new cell and may continue to the next cell without waiting for an acknowledgment from the BSS 60 for each hop (e.g., FIG. 4).

The present invention may, of course, be carried out in other specific ways than those herein set forth without departing from the scope of the invention. The present embodiments are, therefore, to be considered in all respects as illustrative and not restrictive, and all changes coming within the meaning and equivalency range of the appended claims are intended to be embraced therein.

What is claimed is:

1. A method of determining the position of a wireless mobile terminal in a wireless network, the method comprising:
   determining a first timing advance value between the mobile terminal and a cell in a first base station;
   sending a command to said mobile terminal instructing said mobile terminal to:
      synchronize to a second cell and transmit one or more access bursts thereto; and,
      thereafter, without waiting for an acknowledgement of said access bursts to said second cell, automatically synchronize to a third cell and transmit one or more access bursts thereto;
   determining a second timing advance value between said mobile terminal and said second cell;
   determining a third timing advance value between said mobile terminal and said third cell; and
   responsive to determining the timing advance values, the first base station sending the three timing advance values to a Serving Mobile Location Center (SMLC), wherein the SMLC utilizes the three timing advance values and known locations of the first, second and third cells for
   determining the location of said mobile terminal.

2. The method of claim 1 wherein sending said command to said mobile terminal comprises sending a message containing an identifier to be included in said access bursts.

3. The method of claim 2 wherein said message further includes an indication of the number of access bursts the mobile terminal should transmit to said second cell.

4. The method of claim 2 wherein said message further includes one or more frequencies and an indication of the base station identifier to be used for synchronization to said second base station and a temporary identifier used by the mobile terminal when sending said access bursts.

5. The method of claim 1 wherein said command instructs the mobile terminal to synchronize with each of the first, second and third cell successively and to automatically return to said first base station after transmitting said one or more access bursts to said third base station.

6. The method of claim 1 further comprising said mobile terminal automatically suspending, in response to receiving said command, packet data operation until after said transmitting said one or more access bursts to said third base station.

7. An arrangement in a first base station for determining the position of a wireless mobile terminal in a wireless network, comprising:
- means for determining a first timing advance value between the mobile terminal and a cell in the first base station;
- means for sending a command from the first base station instructing said mobile terminal to:
  - synchronize to a second cell and transmit one or more access bursts thereto; and,
  - thereafter, without waiting for an acknowledgement of said access bursts to said second cell, automatically synchronizing to a third cell and transmitting one or more access bursts thereto; means for:
    - determining a second timing advance value between said mobile terminal and said second cell;
    - determining a third timing advance value between said mobile terminal and said third cell; and
- means in the first base station for sending the three timing advance values to a Serving Mobile Location Center (SMLC), wherein the SMLC utilizes the three timing advance values and known locations of the first, second and third cells for determining the location of said mobile terminal.

8. The arrangement of claim 7, wherein the mobile terminal further comprises
- means for including a message containing an identifier in said access bursts.

9. The arrangement of claim 8 wherein said message includes an indication of the number of access bursts the mobile terminal should transmit to said second cell.

10. The arrangement of claim 8 wherein said message further includes one or more frequencies and base station identifier code of the base station for synchronization.

11. The arrangement of claim 7 wherein said command instructs the mobile terminal to synchronize with each of the first, second and third cells successively and-to automatically return to said first base station after transmitting said one or more access bursts to said third cell.

12. The arrangement of claim 7, wherein said mobile terminal further comprises
- means for automatically suspending, in response to receiving said command, packet data operation until after transmitting said one or more access bursts to said third cell.

* * * * *